United States Patent [19]

Christensen

[11] 4,396,110

[45] Aug. 2, 1983

[54] MULTI-SECTION CONVEYOR AND COUPLER THEREFOR

[76] Inventor: Frantz G. Christensen, 501 Oleander Way South, St. Petersburg, Fla. 33707

[21] Appl. No.: 240,234

[22] Filed: Mar. 3, 1981

[51] Int. Cl.³ .............................................. B65G 37/00
[52] U.S. Cl. .................................... 198/576; 403/163
[58] Field of Search ............... 198/583, 576, 575, 584; 403/1, 345, 347, 348, 161, 163, 379, 375

[56] References Cited

U.S. PATENT DOCUMENTS

| | | | |
|---|---|---|---|
| 2,563,427 | 8/1951 | Scott | 198/583 |
| 2,951,577 | 9/1960 | Wilcoxen | 198/584 |
| 3,719,378 | 3/1973 | Windsor | 403/375 X |

FOREIGN PATENT DOCUMENTS 623481  5/1949  United Kingdom ................ 198/584

*Primary Examiner*—Jeffrey V. Nase
*Assistant Examiner*—Dennis J. Williamson
*Attorney, Agent, or Firm*—Kyle W. Rost

[57] ABSTRACT

A multi-section conveyor is assembled from at least one power driven section and a plurality of non-powered sections that derive operating power from the powered section through a coupler linking the sections in tandem. The conveyor sections each have opposite end rollers with a central roller core carrying a diametric cross-pin. The coupler between each pair of sections consists of a pair of shafts linked to transmit the rotation of one shaft to the other, and each shaft is receivable within one of the roller cores. The shaft end so receivable is slotted to engage the cross-pin and thus becomes locked into rotation with the roller. One of the shafts may extend relatively further than the other for initial engagement of the coupler with one roller at a time, and the shaft diameter of one or both shafts may be reduced adjacent to the axial position of the slot where the cross-pin will be located after the coupler is fully engaged with both rollers to provide dynamic locking of the coupler to the joined conveyor sections during conveyor operation.

6 Claims, 6 Drawing Figures

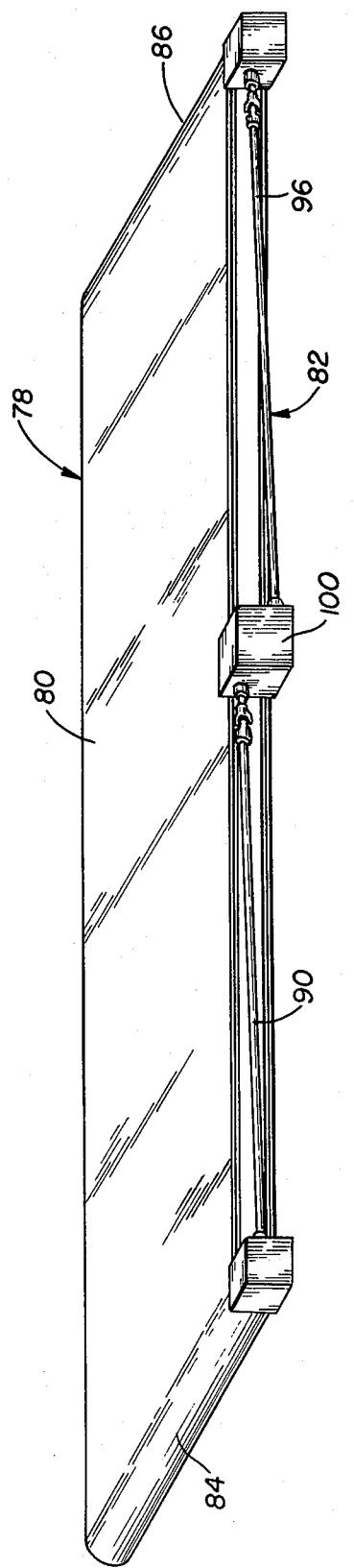
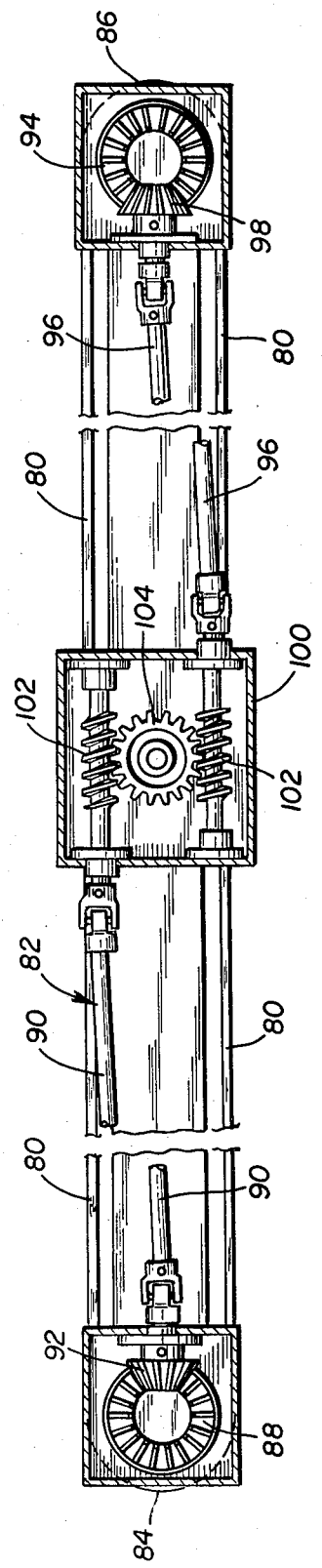

MULTI-SECTION CONVEYOR AND COUPLER THEREFOR

BACKGROUND OF THE INVENTION

1. Field of the Invention

The invention relates to power driver conveyors and conveying systems having plural power-driven conveying stations with means connecting sections for quick assembly and disassembly.

2. Description of the Prior Art

Conveyors are desired to be of specific lengths adapted to the job situation so that the unloading function will deliver goods to the exact area where needed. In many applications the desired end point of the conveyor may vary from time to time, and although both portable and bendable conveyors are known, these are not practical in situations where the end point is moving frequently toward or away from the starting point of the conveyor, requiring frequent changes in the total length of the conveyor. Thus, it has been desired to have conveyors capable of changing length between one fixed end and one variable end or between two variable ends. Further, it has been desired to accomplish this with a minimum of expense. Thus, the assembly of a plurality of short self-contained conveyor sections into a tandem assembly of the desired length would provide the desired flexibility in locating the conveyor ends, but the drive motors for each section would add undue economic penalty to such an arrangement. It is therefore of advantage if only one drive motor is needed for a plurality of associated driven conveyor sections.

Belt conveyors are often driven by application of power to one or more rollers upon which the belt rests. One known method for powering an articulated belt conveyor is by powering one roller that drives a first belt and in turn has a sprocketed end that drives a roller chain. The chain may follow the conveyor path and transmit the motor power to a further sprocketed roller that drives an articulated segment of the conveyor. While such a segment may include a separate belt, the requirement that the roller chain engage the second sprocket prevents the segment from being easily added or removed. A further technique for transmitting power to a remote conveyor belt section is by frictional engagement between the first or drive belt and the second or driven belt. The difficulty in this type of drive is that consistent friction is difficult to maintain between two belt surfaces, as the contact surfaces tend to wear and ride on each other. It has been further proposed to interconnect two conveyor belt sections riding on independent rollers by linking a roller of one belt to transmit rotation to a roller of the second belt, such as by a removeable coupling engaging a particular shape of socket in the rollers. The present invention relates to an improved coupling for joining together and transmitting power between adjacent conveyor sections.

SUMMARY OF THE INVENTION

A conveyor coupler adapted to join and transmit power between a pair of conveyor sections is adapted to engage each such section through an opening in an axial end of a roller supported by the section and in turn supporting a conveyor belt. The coupler includes two substantially parallel shafts joined together near one end by a power transmission means and having their opposite, free ends provided with a transverse slot. The roller that receives the free end of each shaft carries a cross-pin engageable in the transverse slot, thus enabling the power of one conveyor section to be transmitted to the roller and subsequently to another conveyor section via its engaged roller, by means of the two shafts and their power transmission means.

A further aspect of the invention provides for the sequential engagement of the two linked shafts with their associated rollers of the two conveyor sections. One shaft extends axially beyond the other and is thereby enabled to engage the roller cross-pin in advance of the corresponding cross-pin engagement by the second shaft. The first shaft may then be rotated to provide alignment between the second shaft transverse slot and its cross-pin. Equivalently, the positions of the cross-pins in the rollers of each conveyor section could be variously fixed to provide for the initial engagement of one cross-pin. However, the latter alternative would require corresponding variation in the slot depths, while the former permits the slots to terminate at a fixed distance from the power transmission means.

In order to prevent the coupler from losing engagement with the roller cross-pins, dynamic locking means is associated with at least one slot and preferably both for preventing such disengagement as long as the conveyor sections are in operation. A diametric recess such as a notch or taper in the wall of a slot near the intended position of the cross-pin provides such a locking means. During conveyor operation, the pin is driven into the area of reduced shaft dimension and thereby prevented from exiting the slot.

Another aspect of the invention provides for a multi-section conveyor wherein the sections may be used in tandem from at least one powered section to a combination of the one powered section with one or more non-powered sections, the latter deriving power from the powered section drive train and also engages an element of the non-powered section drive train, transmitting power to the otherwise non-powered section. The drive train element in each type of section is preferred to be a roller having an axial cavity or hollow core, each such roller carrying a diametric cross-pin at a predetermined depth in the cavity or core. The tandem sections are joined by means maintaining the drive elements at a predetermined spacing and relative orientation between sections. The coupler includes a pair of cylindrical shafts oriented to be engaged in the drive elements having such predetermined spacing and orientation. The shafts are slotted at their ends adapted to enter the cavity or core, and the shaft length and slot depth are such that the cross-pins are received in the slots when the shafts are engaged to the extent permitted when the coupler bottoms against the conveyor section.

Still another aspect of the invention provides for a conveyor section drive train interconnecting opposite end rollers of each section for transmitting drive forces independently of the conveyor surface itself, thereby relieving the conveyor surface, such as the belt, from the drive forces of the tandem connected sections. Such a drive train may include a longitudinally extending drive shaft and meshing gears carried by the ends of the shaft and the end rollers.

The main object of the invention is to create apparatus permitting a single powered conveyor section to be joined to and provide power to tandem sections by linking a roller of the powered section and a similar roller of the tandem section. This is achieved by providing a cross-pin in each roller core and providing a coupler with slotted shaft ends adapted to engage the cross-pins.

Another object is to provide a conveyor coupler adapted to operate with belt conveyors supported on cylindrical rollers, wherein such conventional rollers can be adapted to engage the coupler. The use of a cross-pin through a cylindrical roller permits the ready engagement between the roller and a cylindrical slotted coupler shaft while eliminating any problem of creating a non-cylindrical socket or cavity within the roller. Thus, a roller of conventional cylindrical design requires only minor modification in order to be adapted for use with the coupler.

A further object is to provide an alignment aid permitting the coupler to mate accurately with each conveyor section. By one shaft of the coupler being longer, the coupler is caused to engage one conveyor section before the other so that alignment can be established independently with each section.

An important object is to create a dynamic locking means that prevents the coupler from working out of engagement with either conveyor section during conveyor operation.

Another important object is to provide a drive train within each conveyor section that operates in cooperation with the coupler to transmit power without loading the conveyor belt.

BRIEF DESCRIPTION OF THE DRAWINGS

FIG. 5 is an isometric view of a conveyor section with drive shafts between end rollers.

FIG. 6 is a side elevational view of the conveyor section of FIG. 5 in partial section, showing the connection of the drive shafts.

DESCRIPTION OF THE PREFERRED EMBODIMENT

Figure 1:
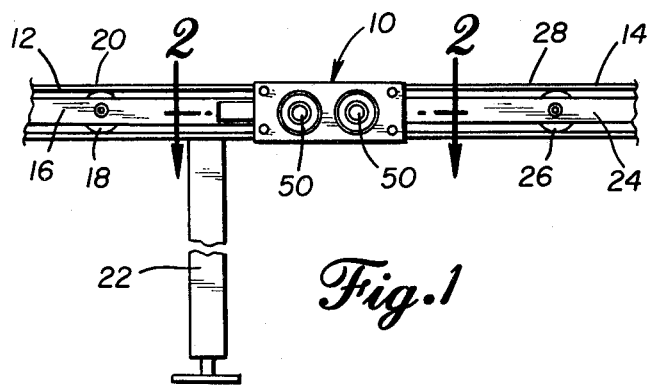
FIG. 1 is a side elevational view of two conveyor sections joined by a coupler.

With reference to the embodiment of FIG. 1, the conveyor coupler 10 is shown as applied to a pair of conveyor sections 12 and 14, wherein section 12 is the first section of the conveyor and includes a support frame 16 on which a plurality of rollers 8 are carried for rotation. An endless belt 20 is both supported by the roller and driven by at least one of the rollers having an associated drive means (not shown). First section 12 is adapted to operate either alone or in combination with one or more second sections 14. Accordingly, section 12 is supported at each longitudinal end by a suitable leg 22 or other support structure attached to frame 16. Second sections 14 are constructed with a support frame 24 similar to frame 16 and carrying rollers 26 and an endless belt 28. Only one end of section 14 is required to be supported although both may be supported if desired. The first and second conveyor sections are assembled in such a way that at the abutting end the second section may share the support of leg 22 of FIG. 1 and therefore requires its own support leg (not shown) only at its opposite end, to the right in FIG. 1.

Figure 2:
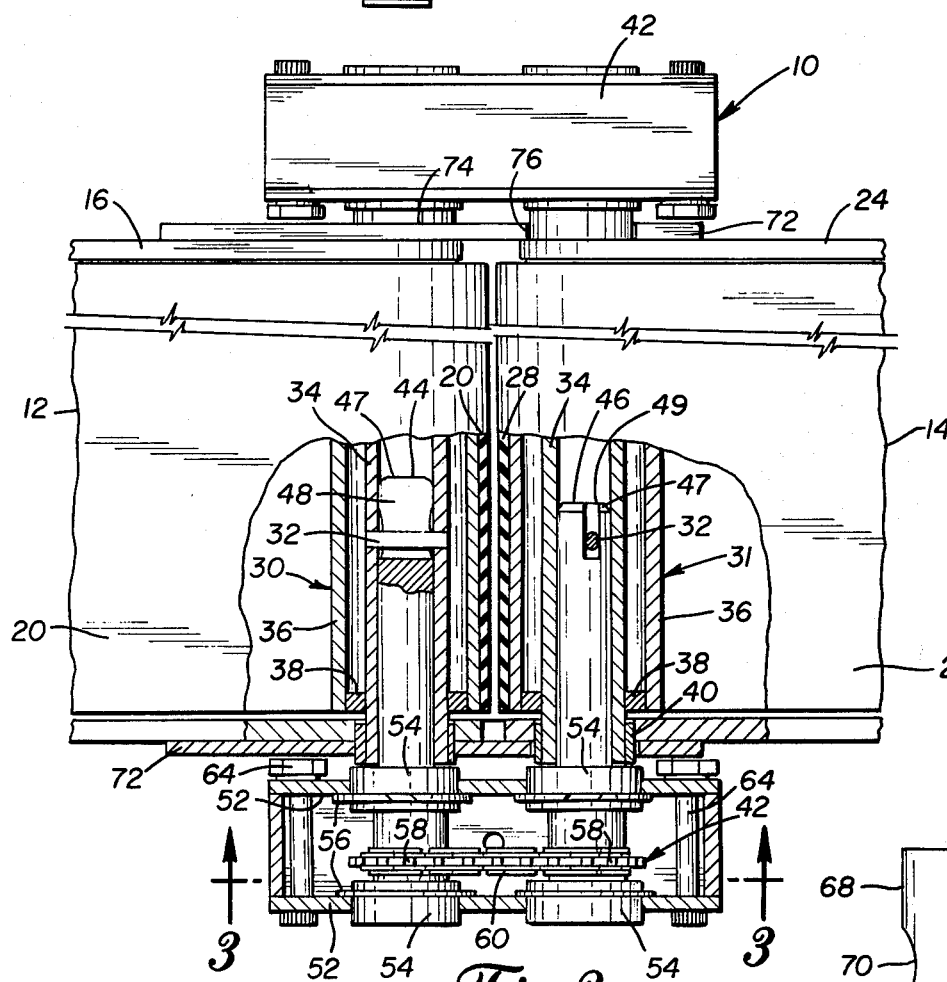
FIG. 2 is a cross-sectional view taken along the plane of line 2—2 of FIG. 1 showing details of the coupler construction and engagement with the conveyor sections.

Details of the coupler 10 and the abutting ends of the first and second conveyor sections are best shown in FIG. 2, where conveyor sections 12 and 14 are shown to have, respectively, at least one roller 30, 31, which may be the terminal roller at the abutment, adapted to mate with the coupler 10 in such a way that the rotation of roller 30 in the first section is transmitted to the roller 31 in the second section. Each roller 30, 31 has the shape of a hollow cylinder and carries a diametrically oriented member such as cross-pin 32 across the hollow center of the cylinder. The rollers 30, 31 may be constructed from inner and outer sleeves 34 and 36, respectively, with the inner sleeve carrying the diametric cross-pin 32 at any desired location across the axis of the sleeve and the outer sleeve providing the support surface for the conveyor belt and protecting the belt from abrasion by the ends of the diametric cross-pin 32. Sleeves 34 and 36 are maintained in concentric relationship by a spacer 38 welded or otherwise fastened to both sleeves in order to prevent relative rotation between them. A portion of the rollers 30, 31 extends through the conveyor frames 16, 24 and may be carried in a bearing or bushing 40.

Coupler 10 includes both a power transmission means 42 and a pair of coupler shafts 44, 46 joined by the transmission means for common rotation about parallel axes. Shaft 44 is adapted to be received telescopically within sleeve 34 and may have a diameter approximately equal to the inner diameter of the sleeve. The first or entry end 47 of shaft 44, which is received in the roller 30, is slotted at 48 to receive in slot 48 a cross-pin 32. Shaft 46 is also sized to be received in a roller 30, 31 and has its entry end 47 slotted at 49 to receive a cross-pin 32. The shafts 44, 46 are of sufficient length that they may be inserted into the rollers 30, 31 and engage the cross-pins 32 in their respective slots, while a second end portion 50 of each shaft 44, 46 extends from the end of the roller for connection to the transmission means.

Figure 3:
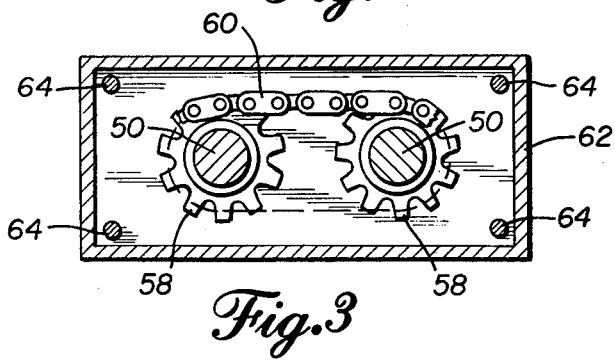
FIG. 3 is a cross-sectional view of the coupler taken along the plane 3—3 of FIG. 2.

The transmission means of coupler 10 may include any structure capable of linking the shafts 44, 46 for common rotation. FIGS. 2 and 3 show one suitable structure to include a pair of spaced plates 52 each apertured to receive the shafts 44, 46 and maintain their separation. Bearings 54 may carry the shafts in the spacer plates, with snap rings 56 maintaining the bearings and plates at the desired axial position on each coupler shaft. A sprocket wheel 58 is connected to each coupler shaft between the spacer plates, and an endless roller chain 60 engages the sprocket wheels 58 to transmit the rotation of either coupler shaft to the other. The spacer plates may be further separated by a rectangular spacer shell 62, which in combination with the spacer plates defines a protective box around the sprockets 58 and roller chain 60. A plurality of fasteners such as bolts 64 compress the spacer plates against the rectangular spacer shell 62 and produce a rigid box structure.

One of the shafts 44, 46 is longer than the other, as shown in FIG. 3 to be shaft 44. The additional length of the one coupler shaft permits it to engage its associated cross-pin 32 before the parallel event occurs with the other coupler shaft as the coupler shafts are being inserted into the rollers 30, 31. This permits one shaft to be rotated by engagement with the cross-pin of a turning roller, while the second shaft has not yet engaged a cross-pin and therefore is being rotated with respect to the non-engaged cross-pin. Regardless of the relative alignment between each cross-pin and its intended slot 48 or 49, a moment of alignment will occur for each coupler shaft as the longer coupler shaft first contacts the cross-pin of the powered or rotating roller 30, while the shorter coupler shaft subsequently contacts the cross-pin of the non-powered, non-rotating roller 31.

Figure 4:
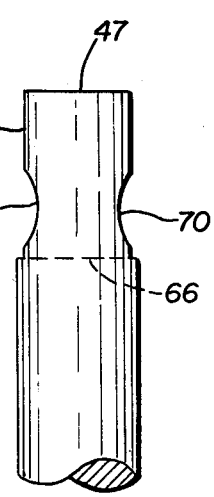
FIG. 4 is an enlarged view of the free end of a coupler shaft, showing the construction of the slot.

Engagement between each of the coupler shafts and an associated cross-pin, after being established, is maintained during conveyor operation by dynamic locking force applied through the configuration of each coupler shaft. The free end of each coupler shaft is slotted in a plane containing the longitudinal axis of the shaft so that the slot lies diametrically across the free end 47. As best shown in FIG. 4, the slot penetrates longitudinally into the coupler shaft to a slot base 66 spaced from the free end 47 by a depth sufficient to assure that a cross-pin can be fully engaged in the depth of the slot. For overall firmness of structure, it is further preferred that the conveyor coupler 10 abut the end of the rollers 30, 31 before either cross-pin bottoms against a slot base 66, as suggested by the gap shown in FIG. 2 between the cross-pin and slot base of each coupler shaft. Therefore, the relative depth of the cross-pin longitudinally in the roller 30, 31 is preferred to be coordinated with the length of each coupler shaft and the slot depth to assure that such a gap is present in the fully engaged coupler 10 and roller 30, 31. With reference again to FIG. 4, the coupler shaft is tapered toward the base of the slot or otherwise reduced in diameter at the side edge 68 of each slot at the longitudinal point 70 where the cross-pin is fully engaged on the slot. This taper or recess 70 cooperates with an engaged cross-pin to prevent the pin from working its way longitudinally out of the slot during rotation of the coupler shaft. The desired locking result is achieved at the minimum when the taper 70 is made on one face of one edge of the slot that will be placed under compression by contact with the cross-pin during operation of the conveyor; however, the taper is preferred to be formed at both side edges at both faces of the slot so that the cross-pin is locked into the slot during both directions of rotation. Additionally, one or both coupler shafts of each coupler 10 may be so tapered.

When first and second conveyor sections are placed in tandem, the necessary relative positioning of the two rollers 30, 31 is achieved by engaging the roller 31 of the second conveyor section in a cradle bracket 72 carried by the frame 16 of the first conveyor section. As shown in FIG. 2, bracket 72 may have an aperture 74 registering with the tip of the roller 30 of the first conveyor section, thereby establishing an exact distance between the aperture 74 and the cradle 76 that receives the roller 31 of the second conveyor section. Such a bracket 72 is carried on each side of frame 16 and permits a coupler 10 to be used either on one or both sides of each roller 30. 31. The second conveyor section 14 may have such a bracket 72 at its distant end from section 12 to permit attachment by a further coupler 10 of still another conveyor section 14.

The operation of a conveyor employing the coupler 10 may then be understood to permit the independent functioning of a single segment 12 having an associated drive means. When the conveyor end point is to be extended beyond the discharge end of the first segment, a second conveyor section 14 of the desired length is attached by first resting the ends of the second conveyor's mating roller 31 in the cradle pocket 76 of bracket 72, thereby supporting the near end of the second conveyor section 14 on the near leg 22 of the first conveyor section 12. Then, with the first conveyor section 12 in operation, the coupler 10 is attached by inserting the two coupler shafts into the hollow centers of the mating rollers, the longer shaft 44 entering the roller 30 of the operating conveyor section 12 and engaging the associated cross-pin 32 before the shorter shaft 46 engages the cross-pin 32 of the non-operating conveyor section 14. The rotating imparted to the longer shaft 44 after it has engaged its cross-pin 32 causes shaft 46 to be rotated with respect to the other cross-pin and produce mutual alignment as required for engagement. Shafts 44 and 46 may then move to fully engaged position with the cross-pins 32 positioned to be engaged in the locking means formed by the tapers 70. Power of the drive means operating the first section 12 is thus transmitted to also drive the second section 14. When the coupler is being attached, the operation of the conveyor section 12 may be by the normal drive means or by any substitute drive means such as hand power. The longer shaft 44 may be inserted into the roller 31 of the non-powered section if the non-powered section can be more conveniently operated at a slow speed by hand to align the slot of the shorter shaft 46 with the cross-pin of roller 30. Additional conveyor sections 14 may be added to the assembled portions of the conveyor until the mechanical limit of the drive means or power transmission system is met. The efficiency of power transmission between sections has been found to be best when the coupler 10 carries the coupler shafts 44, 46 with their respective slots 48, 49 in perpendicular positions as viewed from the free ends 47 of each shaft.

The coupler 10 provides efficient transmission of conveyor power between adjacent sections 12 and 14 or between tandem sections 14. FIGS. 5 and 6 show details of a conveyor section 78 that also transmits power internally with efficiency, removing the drive train function from the conveyor belt 80 so that the load bearing capacity of the section is increased and the potential maximum length of the multi-section conveyor that can be driven from a single powered section 12 is increased. A drive train 82 independent of the belt 80 is connected to roller 84 at a first end of the section 78 and to roller 86 at a second and opposite end. Roller 84 may, for example, be connected to bevel gear 88 carried near one side of the section. The drive train includes first drive shaft 90 carrying bevel gear 92 mesing with gear 88. At the second end of the section, roller 86 similarly carries bevel gear 94, and a second drive shaft 96 carries meshing bevel gear 98. The two drive shafts extend substantially longitudinally with the conveyor section and meet a common junction box 100 at a point intermediate the conveyor ends. Within junction box 100, each drive shaft terminates in a gear engaging a common intermediate idler gear. For example, each drive shaft may terminate in a worm gear 102 each mating an opposite edge of idler gear 104. The rotating of either roller 84, 86 is thus transmitted to the opposite roller via the drive shafts 90, 96 and junction box 100, thereby providing direct power transmission between the end rollers. The drive shafts and junction box may be carried by the conveyor frame, with substantially the same drive train system being used on either a powered section 12 or a non-powered section 14.

The coupler 10 is thus able to link together a series of coveyor sections to form a resultant conveyor of variable length. Each section may have a conveniently short length such as three meters, giving great latitude in the selection of end points and permitting the non-powered sections to be easily moved. It is within the scope of the invention to employ more than one powered section if desired, in which case the plural drive means should be coupled for simultaneous operation. Non-powered sections may be linked by coupler to either one or both powered conveyor sections. Still other changes are possible, and accordingly the scope of the invention is to be limited only by the following claims.

I claim:

1. A conveyor coupler for joining and transmitting power between first and second conveyor sections, each including at least one roller engaging a conveyor belt, the roller having an axial cavity and carrying a transverse pin therein for rotation with the roller, wherein the coupler comprises:

(a) a first coupler shaft having a free end axially receivable in a first conveyor section roller cavity and having a first axial diametric slot defined across said free end, the slot being adapted to receive the transverse pin of the roller therein;

(b) a second coupler shaft having a free end axially receivable in a second conveyor section roller cavity and having a second axial diametric slot defined across the second shaft free end, the slot being adapted to receive the transverse pin of the second section roller therein, wherein the free end of said first coupler shaft extends axially beyond the free end of the second coupler shaft for permitting the first coupler shaft to, in use, engage the transverse pin of a first roller while the second coupler shaft free end is axially spaced from the transverse pin of the second roller substantially juxtaposed with respect to the first roller; and (c) power transmission means linking said first and second coupler shafts in laterally spaced relationship for common rotation for driving either of the first and second conveyor section rollers by the powered rotation of the other.

2. The conveyor coupler of claim 1, wherein said first and second coupler shafts are carried in parallel relationship by said power transmission means and said diametric slots defined in the first and second coupler shafts terminate respectively in first and second bases spaced substantially equal axial distances from the power transmission means.

3. The conveyor coupler of claim 1, further comprising dynamic locking means associated with the slot of at least one of said first and second shafts for positively retaining the shaft against disengagement from the transverse pin of a roller during rotation of the roller.

4. The conveyor coupler of claim 3, wherein said dynamic locking means comprises diametric recess means at a side edge of the slot for receiving the edge of an engaged roller transverse pin during conveyor operation.

5. The conveyor coupler of claim 4, wherein said at least one shaft defines a slot base spaced axially inwardly from the free end of the shaft, and said diametric recess means comprises a taper in the shaft adjacent to the slot, said taper extending toward the slot base from the free end.

6. The conveyor coupler of claim 1, wherein said first and second coupler shafts are carried in parallel relationship by said power transmission means and comprise cylindrical bodies between said free ends and the power transmission means.

* * * * *